(12) United States Patent
Schütz

(10) Patent No.: US 7,151,657 B2
(45) Date of Patent: Dec. 19, 2006

(54) TRANSPORT AND STORAGE CONTAINER FOR LIQUIDS

(75) Inventor: Udo Schütz, Selters/Westerwald (DE)

(73) Assignee: Protechna S.A., Fribourg (CH)

( * ) Notice: Subject to any disclaimer, the term of this patent is extended or adjusted under 35 U.S.C. 154(b) by 368 days.

(21) Appl. No.: 10/664,143

(22) Filed: Sep. 17, 2003

(65) Prior Publication Data
US 2004/0069781 A1    Apr. 15, 2004

(30) Foreign Application Priority Data
Sep. 17, 2002  (DE) ............................... 102 42 954

(51) Int. Cl.
*H05F 3/00* (2006.01)
(52) U.S. Cl. ..................... 361/212; 361/215
(58) Field of Classification Search ............... 361/212, 361/215, 220, 227, 228; 220/1.6, 9.4, 23.9, 220/9.1, 62.16
See application file for complete search history.

(56) References Cited

U.S. PATENT DOCUMENTS

| | | | | |
|---|---|---|---|---|
| 3,289,876 A | * | 12/1966 | De Pew | 220/246 |
| 4,848,566 A | * | 7/1989 | Havens et al. | 206/719 |
| 5,253,777 A | * | 10/1993 | Schutz | 220/571 |
| 5,634,561 A | * | 6/1997 | Pfeiffer | 206/719 |
| 5,877,932 A | * | 3/1999 | Hauck | 361/215 |
| 5,979,685 A | * | 11/1999 | Tz | 220/1.6 |

FOREIGN PATENT DOCUMENTS

| | | |
|---|---|---|
| DE | 196 05 890 A1 | 8/1997 |
| DE | 197 31 518 A1 | 2/1999 |
| DE | 198 15 082 A1 | 10/1999 |

* cited by examiner

*Primary Examiner*—Brian Sircus
*Assistant Examiner*—Danny Nguyen
(74) *Attorney, Agent, or Firm*—Friedrich Kueffner

(57) ABSTRACT

A transport and storage container for liquids has a pallet-shaped support frame made of metal or an electrically conducting plastic material and an exchangeable inner container made of plastic material, supported on the support frame and being of a multi-layer or single-layer configuration provided with a permanently antistatic outer layer. The inner container is a cubic or a parallelepipedal container with four sidewalls, a top and a bottom, an upper closable fill socket, and a tapping fixture. An outer jacket surrounds the inner container and is made of grade bars of metal or sheet metal. An outlet socket, for receiving the tapping fixture, is made of electrically conducting plastic material and connected to the permanently antistatic outer layer of the inner plastic container. In another configuration, the tapping fixture is made of electrically conducting plastic material and has an intake socket connected to the permanently antistatic outer layer.

6 Claims, 3 Drawing Sheets

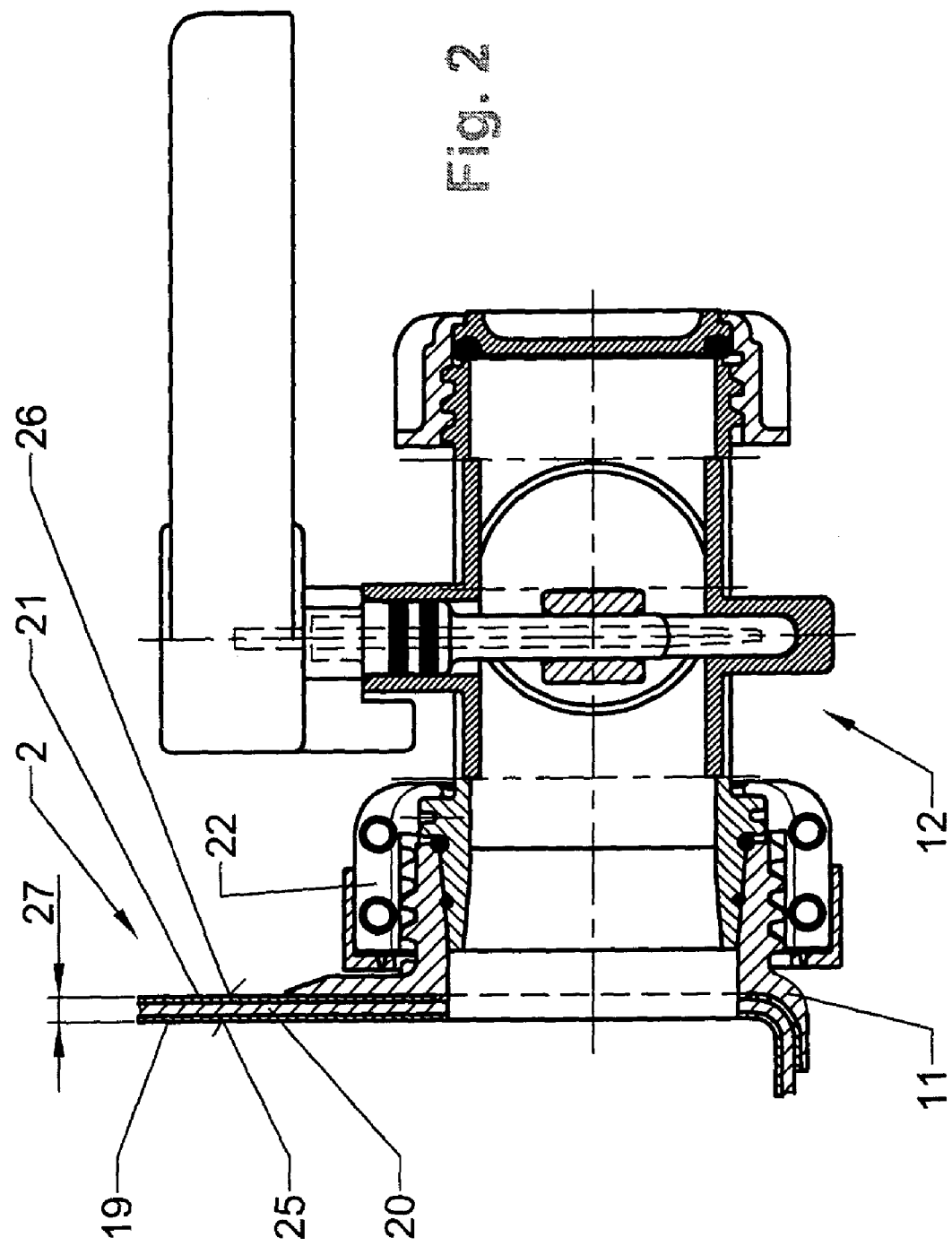

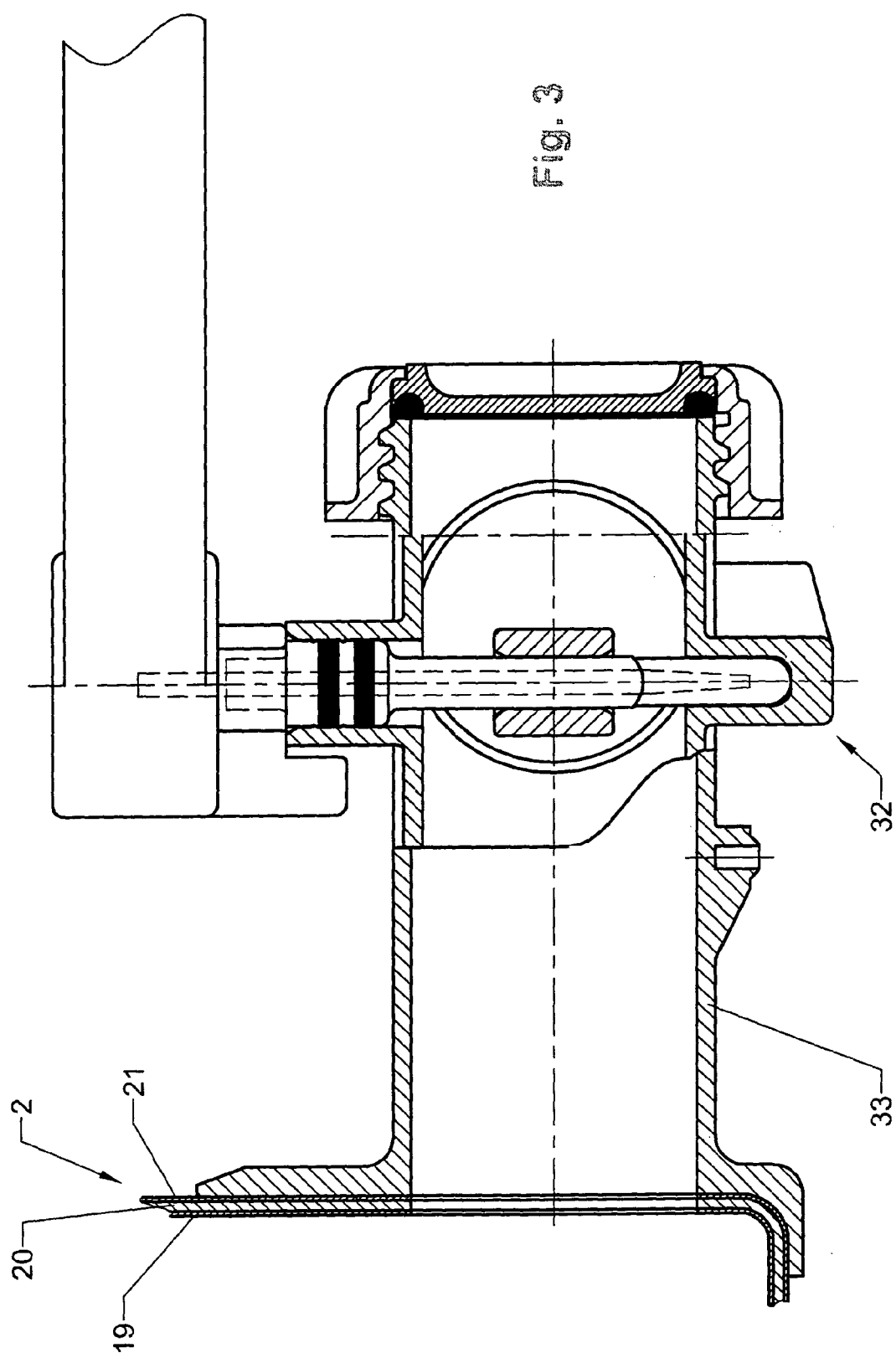

TRANSPORT AND STORAGE CONTAINER FOR LIQUIDS

BACKGROUND OF THE INVENTION

1. Field of the Invention

The invention relates to a transport and storage container for liquids, comprising a pallet-shaped support frame of metal or of an electrically conducting plastic material, an exchangeable inner container of plastic material supported on the support frame and being of a single-layer or multi-layer configuration provided with a permanently antistatic outer layer, wherein the inner container is of a parallelepipedal shape or of a cubic shape and has four sidewalls, a bottom, and a top, an upper closable fill socket, and a tapping fixture. The transport and storage container also comprises an outer jacket surrounding the inner container and being comprised of grade bars of metal or sheet metal.

2. Description of the Related Art

The inner plastic container of the transport and storage container of the aforementioned kind for liquids, as disclosed in DE 196 05 890 A1, has a permanently antistatic outer layer which serves together with the metallic support frame as electrical grounding means in order to prevent electrostatic charging of the surface of the inner plastic container by friction of the inner container on the metallic outer jacket during transport. In this way, electrical discharges with spark generation between the inner plastic container and the metal grade jacket, which could result in ignition of flammable materials contained in the transport and storage container and of explosive mixtures of gases and vapors in closed rooms, is to be prevented. However, this exterior grounding by means of a permanently antistatic outer layer of the plastic container cannot dissipate electric charges which are caused during filling and emptying of the inner container and stirring of liquids, for example, for mixing purposes, by friction of liquid on the inner surface of the container and by friction within the liquid itself.

DE 197 31 518 A1 describes a transport and storage container for liquids which is grounded by means of a grade hood of thin metal wire placed onto the inner plastic container or an electrically conducting net or woven fabric applied onto the inner container. With this outer grounding only the electrical charges occurring on the outer surface of the container are dissipated as in the case of the transport and storage container according to DE 196 05 890 A1. Moreover, the electrical grounding of the liquid container by a grade hood, a net or a woven fabric is technically complex and results in a corresponding increase of the manufacturing costs.

In the transport and storage container for liquids disclosed in DE 198 15 082 A1, a grounding member is provided on the tapping fixture mounted on the outlet socket of the inner container. It is embodied as a curved sheet metal or metal plate that extends across a portion of the inner bore of the tapping fixture and is connected by means of a fastening screw and a grounding cable to the support frame of the container. By means of this internal grounding action only in the electrical charges which form within the liquid as a result of liquid friction are dissipated. Moreover, this liquid container entails the danger that upon transport and storage of aggressive liquids the grounding member is damaged by the liquid such that the electrical grounding action is no longer functioning.

SUMMARY OF THE INVENTION

It is an object of the present invention to further develop the transport and storage container for liquids of the aforementioned kind with respect to a safe and complete grounding action of the inner plastic container and an inexpensive manufacture.

In accordance with the present invention, this is achieved according to a first embodiment in that an outlet socket for attachment of a tapping fixture is provided, which is comprised of electrically conducting plastic material and is connected to the permanently antistatic outer layer of the inner plastic container. According to a second embodiment, a tapping fixture made of electrically conducting plastic material is provided whose inlet socket is connected with the permanently antistatic outer layer of the inner plastic container.

The invention is based on the principle that for a transport and storage container for liquids, which is comprised of a multi-layer inner plastic container with a permanently antistatic outer layer, an outer jacket made of a grade jacket of metal or sheet metal jacket, as well as a pallet-shaped support frame made of metal or an electrically conducting plastic material, the outlet socket of the inner container or the tapping fixture is to be manufactured of an electrically conducting plastic material, and, if needed, sections of an electrically conducting plastic material are embedded in the walls and the bottom and the top of the inner container which sections provide electrical connections between the inner and outer surfaces of the inner container. In this way, the electrical charges, caused during transport on the container surface by friction of the inner container and the outer jacket on one another and caused during filling and emptying of the transport and storage container and upon stirring of the liquids in the container, for example, for mixing purposes, by liquid friction within the liquid and on the inner walls of the inner container, are dissipated or discharged into the ground by means of the electrically conducting wall, bottom and top sections, the permanently antistatic outer layer, and the electrically conducting outlet socket of the inner container or the conducting tapping fixture, the outer jacket, and the support frame. By means of the electrically conducting embodiment of the outlet socket of the inner container or of the tapping fixture, in whose flow opening the greatest liquid friction within the container will occur upon removal of liquid from the container as a result of the flow speed of the liquid, an electrostatic charging of the container is avoided in a simple and effective way. The electric grounding of the container surface and the inner plastic container and of the liquid to be transported or to be stored therein makes possible the utilization of the transport and storage container as a container for hazardous (flammable) liquids and emulsions such as solvents, paints, and lacquers with a flash point <35° C. as well as the use of the container in work rooms in which an explosive atmosphere can be formed comprised of gases, vapors, or mist.

BRIEF DESCRIPTION OF THE DRAWING

In the drawing:

FIG. 2 shows on a larger scale in comparison to FIG. 1 a vertical section of the outlet area of the container with a tapping fixture screwed onto the outlet socket of the inner container;

FIG. 3 shows on a larger scale in comparison to FIG. 1 a vertical section corresponding to FIG. 2 with a tapping fixture that is fused to the inner container.

DESCRIPTION OF THE PREFERRED EMBODIMENTS

Figure 1:
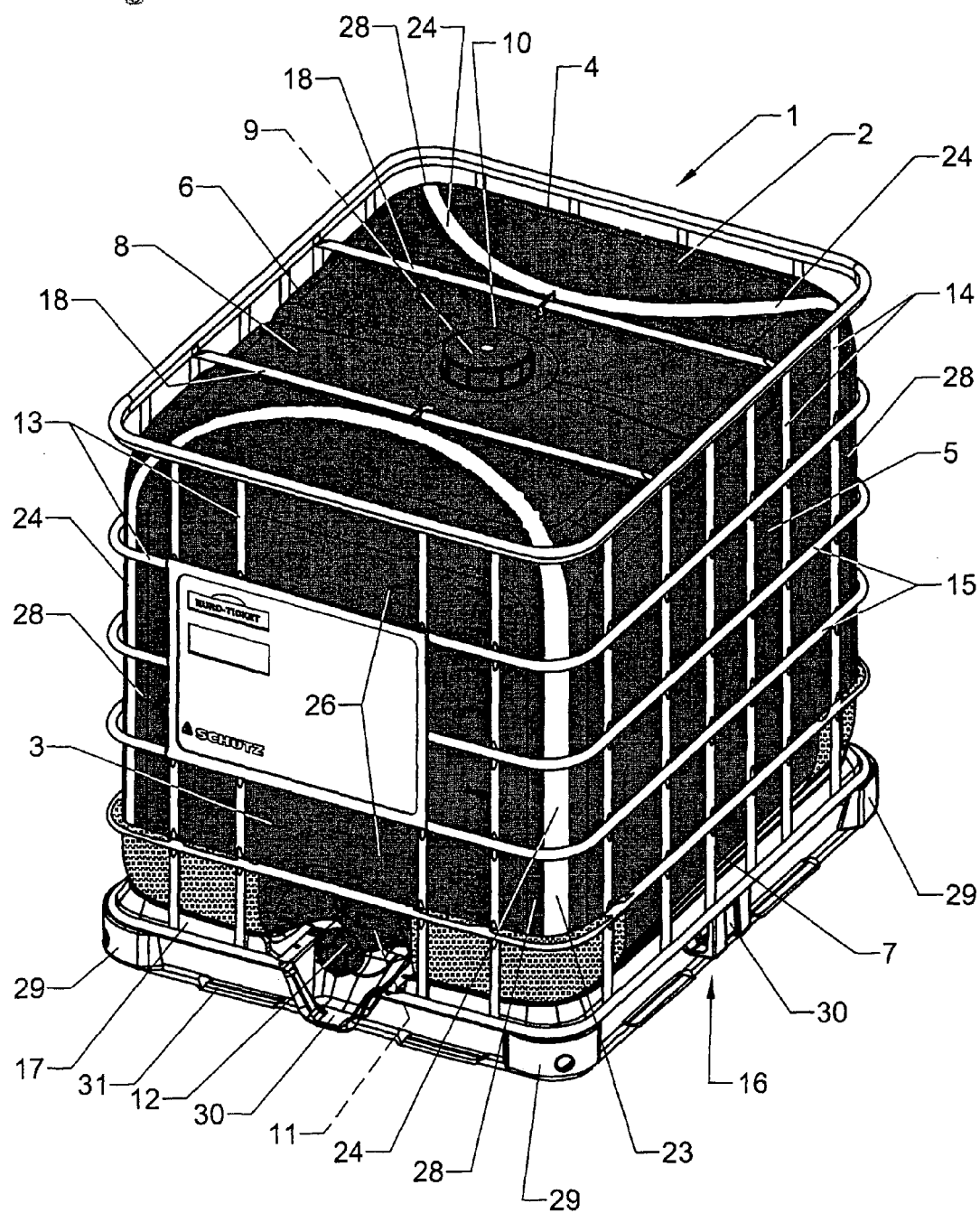
FIG. 1 is a perspective illustration of a transport and storage container.

The transport and storage container 1 for liquids, which can be used as a disposable or reusable container, has the following main components: an exchangeable parallelepipedal inner container 2 of polyethylene comprising an end wall 3, a back wall 4, and two sidewalls 5, 6 as well as a bottom 7, configured as a drainage bottom, and a top 8 provided with a fill socket 9 that can be closed by a screw lid 10 as well as an outlet socket 11 in the lower section of the end wall 3 comprising a tapping fixture 12; an outer jacket 13 of crossing vertical and horizontal grade bars 14, 15 made of metal; a pallet-shaped support frame 16 with a bottom tub 17 made of sheet metal for receiving the inner plastic container 2; as well as two top bars 18 of metal for protecting the inner container 2.

The end wall 3, the back wall 4, the side walls 5, 6 as well as the bottom 7 and the top 8 of the inner plastic container 2, produced of high-density polyethylene by extrusion blow molding, are comprised of an inner layer 19, a central layer 20 as well as a permanently antistatic outer layer 21 containing a proportion of conducting carbon black. The thickness of the central layer 20 is 1 to 2 mm, preferably 1.5 mm, and the thickness of the inner and outer layers 19, 21 is 0.1 to 0.5 mm, preferably 0.2 mm.

For manufacturing the central layer 20 a recycled granular material or ground material of pure polyethylene and/or polyethylene containing conducting carbon black is used, and as the starting material for the inner and the outer layers 19, 21 new granular polyethylene material is used.

The inner plastic container, for example, can also be comprised of a six-layer configuration comprising an inner layer of pure high-density polyethylene; a barrier layer of polyamide or ethylene vinyl acetate copolymer, provided against permeation of oxygen and hydrocarbons and embedded in two bonding agent layers of low-density polyethylene; a central layer of recycled granular or ground material of pure high-density polyethylene and/or high-density polyethylene containing conducting carbon black; as well as a permanently antistatic outer layer of high-density polyethylene containing conducting carbon black.

The outlet socket 11 of the inner plastic container 2 is manufactured as an injection-molded part of an electrically conducting plastic material, preferably high-density polyethylene containing carbon black. When extrusion blowing the inner container 2, the outlet socket 11 placed into the blow mold is fused to the permanently antistatic outer layer 21 of the inner container. The high carbon black proportion of the polyethylene enables a specific surface resistance of less than or equal to $10^5$ Ohm and a specific volume resistance of less than or equal to $10^3$ Ohm of the outer layer 21 and of the outlet socket 11 of the inner container.

The tapping fixture 12, which is fastened by means of a spigot nut 22 on the outlet socket 11 of the inner container 2 and the screw lid 10 for closing the fill socket 9 of the inner container 2 can be made of an electrically conducting plastic material, preferably high-density polyethylene containing a carbon black component.

Into the body of the inner container 2 sections 23 of high-density polyethylene containing conducting carbon black are integrated in the form of strips 24; they provide electrical connections between the inner surface 25 and the outer surface 26 of the inner container 2 and have a wall thickness matching the wall thickness 27 of the inner container 2. The electrically conducting strips 24 (the light colored portions in FIG. 1) extend vertically above the corner areas 28 between the lateral walls 3–6 and/or above the walls and at a slant across the bottom 7 and the top 8 of the inner container 2.

The bottom tub 17 of the support frame 16 is positioned at a certain spacing on corner and center legs 29, 30 and a bottom frame 31 or rails so that the bottom tub 17 for transporting the container 1 can be engaged from below at four sides by the gripping arms of a transport devise, such as a forklift. The legs 29, 30 and the bottom frame 31 or the rails are made of metal or an the electrically conducting plastic material, for example, polyethylene containing conducting carbon black so that the transport and storage container 1 is electrically grounded by means of the electrically conducting strips 24, the permanently antistatic outer layer 21, and the outlet socket 11 of the inner plastic container 2, the outer jacket 13, and the support frame 16; in this way, electrical charges which are formed on the inner surface of the inner container and in the liquid goods as well as on the outer container surface can be dissipated or discharged into the ground.

FIG. 3 shows a further embodiment of the transport and storage container 1 with a tapping fixture 32 of high-density polyethylene containing conducting carbon black. The fixture 32 has an inlet socket 33 fused to the permanently antistatic outer layer 21 of the inner plastic container 2.

While specific embodiments of the invention have been shown and described in detail to illustrate the inventive principles, it will be understood that the invention may be embodied otherwise without departing from such principles.

What is claimed is:

1. A transport and storage container for liquids, comprising:
    a pallet-shaped support frame made of metal or an electrically conducting plastic material;
    an exchangeable inner container made of plastic material, supported on the support frame and being of a multilayer or single-layer configuration provided with a permanently antistatic outer layer;
    wherein the inner container is a cubic or a parallelepipedal container comprising four sidewalls, a top and a bottom, an upper closable fill socket, and a tapping fixture;
    an outer jacket surrounding the inner container and comprised of grade bars of metal or sheet metal;
    an outlet socket, for receiving the tapping fixture, comprised of electrically conducting plastic material and connected to the permanently antistatic outer layer of the inner plastic container;
    wherein the outlet socket is fused to the permanently antistatic outer layer of the inner container.

2. The container according to claim 1, wherein the inner container has integral sections comprised of an electrically conducting plastic material, wherein the integral sections form electrical connections between an inner surface and an outer surface of the inner container.

3. The container according to claim 2, wherein the sections of the inner container are strips having a thickness matching a wall thickness of the inner container.

4. A transport and storage container for liquids, comprising:
    a pallet-shaped support frame made of metal or an electrically conducting plastic material;
    an exchangeable inner container made of plastic material, supported on the support frame and being of a multilayer or single-layer configuration provided with a permanently antistatic outer layer;

wherein the inner container is a cubic or a parallelepipedal container comprising four sidewalls, a top and a bottom, an upper closable fill socket, and a tapping fixture;

an outer jacket surrounding the inner container and comprised of grade bars of metal or sheet metal;

wherein the tapping fixture is comprised of electrically conducting plastic material and has an intake socket fused to the permanently antistatic outer layer of the inner plastic container.

5. The container according to claim 4, wherein the inner container has integral sections comprised of an electrically conducting plastic material, wherein the integral sections form electrical connections between an inner surface and an outer surface of the inner container.

6. The container according to claim 5, wherein the sections of the inner container are strips having a thickness matching a wall thickness of the inner container.

* * * * *